(12) United States Patent
Lee

(10) Patent No.: US 9,866,499 B2
(45) Date of Patent: Jan. 9, 2018

(54) APPARATUS AND METHODS FOR MULTIMODE INTERNETWORKING CONNECTIVITY

(76) Inventor: Chooi Tian Lee, Selangor (MY)

( * ) Notice: Subject to any disclaimer, the term of this patent is extended or adjusted under 35 U.S.C. 154(b) by 16 days.

(21) Appl. No.: 13/991,124

(22) PCT Filed: Jul. 16, 2012

(86) PCT No.: PCT/MY2012/000203
§ 371 (c)(1),
(2), (4) Date: May 31, 2013

(87) PCT Pub. No.: WO2013/015673
PCT Pub. Date: Jan. 31, 2013

(65) Prior Publication Data
US 2013/0242984 A1      Sep. 19, 2013

(30) Foreign Application Priority Data

Jul. 22, 2011 (MY) .............................. 2011003441

(51) Int. Cl.
*H04L 12/933*  (2013.01)
*H04L 12/28*   (2006.01)

(52) U.S. Cl.
CPC .......... *H04L 49/15* (2013.01); *H04L 12/2858* (2013.01)

(58) Field of Classification Search
None
See application file for complete search history.

(56) References Cited

U.S. PATENT DOCUMENTS

| 6,266,348 | B1 * | 7/2001 | Gross et al. ................. 370/493 |
| 6,275,693 | B1 * | 8/2001 | Lin et al. ................... 455/414.3 |
| 6,381,244 | B1 * | 4/2002 | Nishimura et al. ...... 370/395.21 |
| 7,272,141 | B1 * | 9/2007 | Tang ......................... 370/395.2 |
| 7,570,630 | B1 * | 8/2009 | Phillips et al. ............... 370/352 |

(Continued)

FOREIGN PATENT DOCUMENTS

WO          0031929 A2     6/2000

OTHER PUBLICATIONS

International Search Report for corresponding International Application No. PCT/MY2012/000203 dated Dec. 6, 2012.

(Continued)

*Primary Examiner* — Noel Beharry
*Assistant Examiner* — Ruihua Zhang
(74) *Attorney, Agent, or Firm* — Myers Wolin, LLC

(57) ABSTRACT

This invention presents a digital network system able to concurrently provide multimode internetworking connectivity session over a plurality of disparate network systems, from User Premise Device (UPD) to NSP, CSP or ASP network gateways, and providing a plurality of internetwork environment. The invention also provide the methods for the support of the following internetworking connectivity services, concurrently:—a) public and shared-media Internet services; b) MPLS-enabled and IP-based Virtual Private Network (VPN) services; c) hybrid network system connection sessions among disparate connection-oriented and connectionless network systems; and d) end-to-end, connection-oriented, and circuit-switching connection sessions for VDMI-based application services through digital transceiver, be it xDSL or VCC-based land-line or wireless medium.

24 Claims, 10 Drawing Sheets

(56) References Cited

U.S. PATENT DOCUMENTS

| | | | |
|---|---|---|---|
| 2002/0047637 A1* | 4/2002 | Victor | 315/294 |
| 2002/0150108 A1* | 10/2002 | Nattkemper et al. | 370/397 |
| 2003/0123449 A1* | 7/2003 | Kuhl | H04L 12/5601 370/395.1 |
| 2004/0085969 A1* | 5/2004 | Chen et al. | 370/397 |
| 2005/0089052 A1* | 4/2005 | Chen | H04L 12/2803 370/401 |
| 2006/0007946 A1* | 1/2006 | Kastenholz | H04L 49/15 370/401 |
| 2006/0171400 A1* | 8/2006 | Stein et al. | 370/397 |
| 2008/0165781 A1* | 7/2008 | Voit et al. | 370/392 |
| 2009/0285096 A1* | 11/2009 | Yousef | H04L 1/0052 370/235 |
| 2010/0054316 A1* | 3/2010 | Mishra et al. | 375/224 |

OTHER PUBLICATIONS

International Preliminary Report on Patentability for corresponding International Application No. PCT/MY2012/000203, dated Jan. 28, 2014, with written opinion.

\* cited by examiner

APPARATUS AND METHODS FOR MULTIMODE INTERNETWORKING CONNECTIVITY

FIELD OF THE INVENTION

The invention herein relates to the field of digital network and communication transmission system, more particularly, it relates to an apparatus able to provide multimode internetworking connectivity over a plurality of disparate network systems, service providers, and internetworking environments, concurrently and a method thereof.

BACKGROUND OF THE INVENTION

The advent of digital technology had led to the convergence of computing, networking, and high-bandwidth communication technologies to provide network connectivity for a multiplicity of integrated and interactive multimedia applications. Due to the development and demand of said multimedia applications, it is inevitable that network systems and infrastructures have to evolve from a myriad of discrete network systems into integration as well as hybridization of network systems and infrastructures, giving rise to network systems such as Multi-Protocol Label Switching (MPLS) enabled IP system.

In the internetworking environment, the Internet is presently the only global internetworking environment. The Internet is built upon Internet Protocol (IP) suites of network protocol stacks. Using IP-based routers and MPLS switches systems, data is routed from source to destination endpoints.

Currently, end-user would subscribe for Internet services from a single Internet Service Provider (ISP) by having interconnection between the Subscriber Network Equipment (SNE) and the ISP network gateway equipment. To provide for connectivity, the ISPs utilize existing circuit-based telephony switches and/or cable television (TV) infrastructures through copper wire, optic fibre, and/or wireless means to provide transmission medium services for network connectivity.

As known by those who are well-versed in the field, said Subscriber Network Equipment (SNE) has an operating system serving as network access controller for said SNE. Said network access controller has relevant network protocol stacks to support connectionless network systems, such as Internet Protocol (IP) as well as, to support Signaling System No. 7 (SS-7) network signaling and point-to-point connection, such as Point-To-Point Protocol (PPP).

Said SNE either works as a stand-alone or as a multiplexer able to provide network connectivity to a plurality of network-enabled User Premise Devices (UPD). Said SNE not only provides Local Area Network (LAN) based connectivity services for multi-connections and sessions of said plurality of User Datagram Protocols (UDP) at theft premises, but also provides external network connectivity and access to the Internet.

With SNE, such as Digital Subscriber Line (xDSL), Asynchronous Transfer Mode (ATM), and the likes, its network controller utilizes call establishment and PPP protocols to establish connectivity from the subscriber premise to the Internet Service Provider (ISP) network gateway switches using telephony network infrastructure. The Asynchronous Transfer Mode/Long-Term Evolution (ATM/LTE) network systems provide connectivity on the telephony section of the network while the MPLS-enabled IP network interfaces, supporting several Permanent Virtual Circuits (PVC), provides connectivity among a plurality of MPLS-enabled IP network switches on the Internet network section.

For data communication over copper telephony lines, frequencies not used for analog voice services are utilized for data transmission through the use of multi-carrier band modem, such as xDSL. Said multi-carrier band modems utilized Frequency-Division Multiplexing (FDM) means and Discrete Multi-Tone (DMT) line code technology, to enable greater data service capacity by dividing the useful bandwidth into discrete and smaller frequency channels.

This multi-carrier band methodology is also utilized in wireless data communication from the carrier bandwidth spectrum. In addition, said multi-carrier band methodology had also evolved to incorporate not only the use of frequency and code-division multiplexing but also time-division multiplexing technology, as well.

With DMT implementation, all available data bandwidth for data transmission is allocated to two transmission channels, one for upload and the other for download. Said upload and download channels provide for connectivity between the SNE and the ISP network gateway. It is a common practice for most xDSL and wireless modems to allocate a pre-defined discrete range of frequencies for download channel while another pre-defined range of frequencies for upload channel. With adaptive rate-based DSL modem said allocation of predefined discrete range of frequencies had been eliminated and replaced with dynamic allocation of bandwidth frequencies.

During initialization of xDSL modems, the controller of the modern would test each of the carrier bands, known as "bin", to establish the signal-to-noise ratio (SNR) for each multi-carrier band frequency. The controller will then make a plan on how to exploit each of the bins through what was termed "bits per bin" allocation. Those bins that have a good SNR will be chosen to transmit signals with a greater number of possible encoded values in each main clock cycle. If the SNR of the bins changes, the DSL modem can alter the bits-per-bin allocations.

It should be noted that although prior art provide for the classification of Quality of Service (QoS), based upon SNR factor, for each carrier band, it did not have the ability to prioritize and differing QoS data service for a plurality network connectivity based upon said QoS classification. As known by those well-versed in the field, none of the prior art documents, including those which use adaptive allocation of bandwidth technology, teaches means to dynamically portion bandwidth of differing QoS classification to support multi-mode connectivity sessions to multiple service providers or internetworking environments.

It should also be noted that data network devices disclosed in prior art documents only provide the means for multiple UPD connectivity for uploading and downloading channels, from the subscribers to a single ISP network gateway source, for a single-mode internetworking service. None of the prior art documents teach the means to support multi-mode connectivity sessions having the ability to subscribe to multiple ISPs. In addition, said network connectivity from existing ISPs provides only to a shared-media and connectionless IP-based internetworking environment. Thus prior art documents are only able to provide a single-mode internetworking environment.

With the increase usage and knowledge gain about the Internet network technology, the inherent weakness of shared-media and connectionless internetworking environment, which is its security vulnerability at the network level, had became well-known. Concern regarding the Internet inherent security vulnerability would inevitably leads to the need to develop a more secure internetworking environment, from a network level perspective.

From historic perspective, should one view the evolution of the telephony environment, one could gain insight to the possible evolution of the future multimedia internetworking environment. The first iteration of telephony environment is a party-line environment where there is no network switching capability. Calls were broadcast through the phone line to a collection of interconnected telephone sets, similarly to first iteration of shared-media data LAN network systems.

As usage for telecommunication increases along with the number of user sets, switching capability was implemented at the exchange level, initially using manual means which then advance to mechanical means. This gave rise to the second iteration of telephony network systems. Said second telephony comprises of a hybrid of switched and non-switched network topology, which in a sense, resemble the present MPLS-enabled IP based network system.

Privacy issue and requirement from end-users, as well as, advent of electronic means eventually led to the third iteration of telephony systems and environment, end-to-end connected-oriented and dedicated-media communication thorough initially circuit-based and later to virtual circuit-switching methods.

As known by those well-versed in the art, hybrid MPLS-enabled IP network system enables circuit-switching for IP technology. Whereas technologist are aware the network environment is more secure at the MPLS network system section due to the use of circuit-switching method, they also understood that the network security vulnerability could be exploited at the IP section of network and router.

This is due to the ability for malicious users to exploit IP connectionless/stateless and share-media scheme of communication for anonymous intrusive eavesdropping, and more importantly, the ability to insert malicious instructions or programs at the network-level. Thus, there is a need to elimination said area of vulnerability in order to enhance security in the network-level of the environment.

In short, there is a need for another internetworking system and environment which does not, in anyway, uses connectionless and shared-media network topology and methodology. Method for creating such internetworking environment was shown in Malaysia Patent No. MY-129914-A by C T Lee, coined as Virtual Dedicated-Media Internetworking (VDMI) environment.

As known by those skilled in the art, prior art neither have the ability subscribe to nor concurrently support more than one ISP not to mention the ability to provide subscribers to subscribe to disparate internetworking environments. Basically, present network devices are not able to concurrently support dedicated-media and connection-oriented internetworking environment, such as VDMI, along with the present shared-media Internet environment. In short, prior art documents are engineered in a way where they are neither able to concurrently support multiple ISPs nor multi-mode internetworking environment, at the subscriber level.

The present invention is design to able subscribers to subscribe for multimode connectivity to multiple ISP and Application Service Provider (ASP) for disparate internetworking environments. The present invention provides for a novel controller for network devices, having means to subscribe and allocate resources for connectivity to multiple ISP and ASP in a multimode internetworking environment, concurrently.

SUMMARY OF THE INVENTION

The first principal objective of the present invention is to provide a system having the ability to concurrently subscribe for network connectivity sessions to disparate shared-media and dedicated-media internetworking environments for Internet, MPLS-enabled VPN, and Virtual Dedicated-Media Internetworking services.

The second principal objective of the present invention is to provide the methods for the ability to portion bandwidth allocated for said communication channels, for connections to a plurality of disparate network systems and environments, concurrently, from a network transceiver, using either multi-carrier bands or Virtual Connection Circuit (VCC) method.

The third principal objective of the present invention is to provide said transceiver's controller with network protocol stacks and access control procedures for the establishment of communication sessions not only for IP-based application services but also for VDMI-based applications services.

The fourth principal objective of the present invention is to provide the method for dynamic allocation of carrier bands of spectrum and frequency based medium, as well as, for bandwidth allocation for VCC systems, to enable said transceiver to concurrently support connectivity sessions to plurality of network and application service providers in a plurality of internetworking environment.

The fifth principal objective of the present invention is to provide call establishment capability for the transceiver controller to communicate to public VCC network central controller and with the destination network gateway transceiver for the subscription and establishment for communication channels from said transceiver to said network gateways.

The sixth principal objective of the present invention is to provide end-users with concurrent connectivity to public and shared-media Internet services, MPLS-enabled IP Virtual Private Network (VPN) services, entirely connection-oriented sessions using end-to-end circuit-switching for VDMI-enabled internetworking services for discrete and hybrid types of application services, among disparate connection-oriented and connectionless network systems and environments for a myriad of applications.

DETAILED DESCRIPTION OF THE INVENTION

Figure 1:
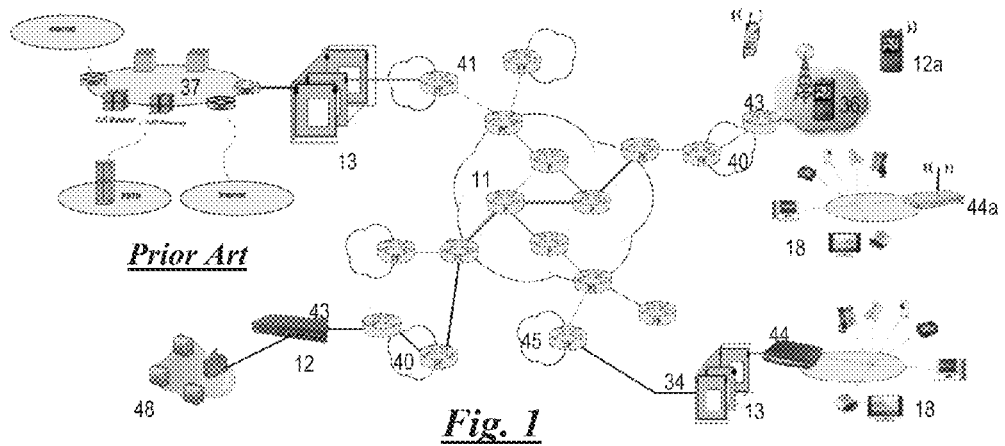
FIG. 1 illustrates prior art network topology of a plurality of network system and infrastructures supporting single-source Service Provider and single-mode internetworking connectivity.

FIG. 1 illustrates the present global shared-media internetworking environment, the Internet, operating over a plurality of interconnected digital network systems topology. For fast Internet services, said global Internet backbone network system (11) utilizes MPLS-based circuit-switching capability for interconnecting a plurality of regional Internet Service Provider (ISPs) Internet systems (41), Multi-Protocol Label Switching (MPLS) based Virtual Private Networks (VPN) (40) and mobile networks (36).

As shown, the Subscriber Network Equipment (SNE) transceiver (44, 44a) functions either as a standalone or multiplexer, able to provide connectivity for a plurality of sub-net of User Premise Device (UPD) transceivers (18), through wired or wireless means. As illustrated, said SNE is only able to support a single connection to a single ISP (45) to provide connectivity for Internet (34) services.

Figure 2:
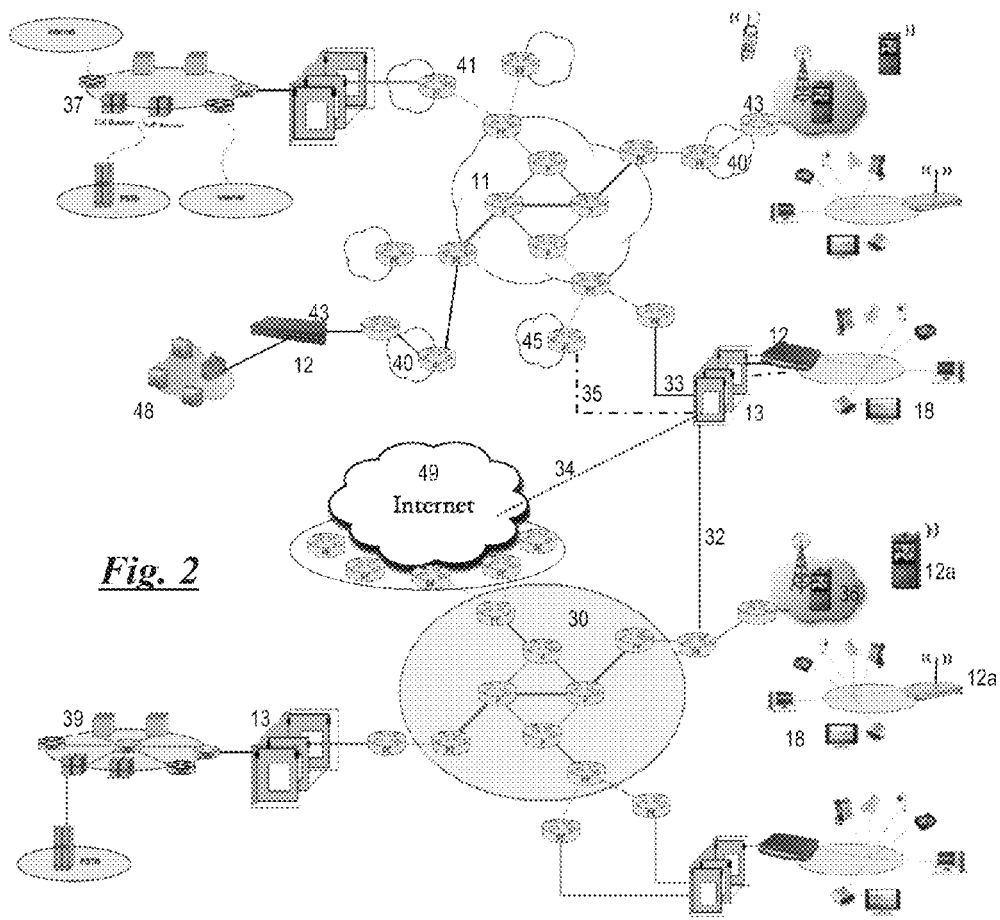
FIG. 2 depicts present invention network topology of a plurality of network system and infrastructures supporting multi-mode internetworking environment connectivity to a plurality of Service Providers.

FIG. 2 illustrated the ability of the present embodiment SNE transceivers (12, 12a) to subscribe, support, and manage multiple communication session in order to provide concurrent connectivity of public and shared-media Internet services (34), IP (Internet Protocol) based and associative addressing switching-enabled VPN services (35), hybrid network system connection sessions among disparate connection-oriented and connectionless network systems services (33), and end-to-end, connection-oriented, and circuit-switching connection sessions for Virtual Dedicated-Media Internetworking (VDMI)-based application services (32).

As shown, the SNE transceiver (12, 12a) could functions either as a standalone or a multiplexer, able to provide connectivity for a plurality of sub-net transceivers (18), through wired or wireless means, and is able to connect to a plurality of service provider networks and internetworking services.

As depicted, those wireless transceivers (12a) are connected to mobile network (39) having associative addressing means, for routing and address resolution, while the Digital Subscriber Line (xDSL) transceivers (12) are connected to Digital Subscriber Line Access Multiplexer (DSLAM) (13) having Virtual Circuit Connection (VCC) multiplexing means and is subsequently connected to associative addressing switching-enabled shared-media network system (40) and/or VCC connection-oriented circuit-switching network system (30). Said xDSL and wireless transceivers (12, 12a) utilized a plurality of carrier bands for signal transmissions.

Figure 3:
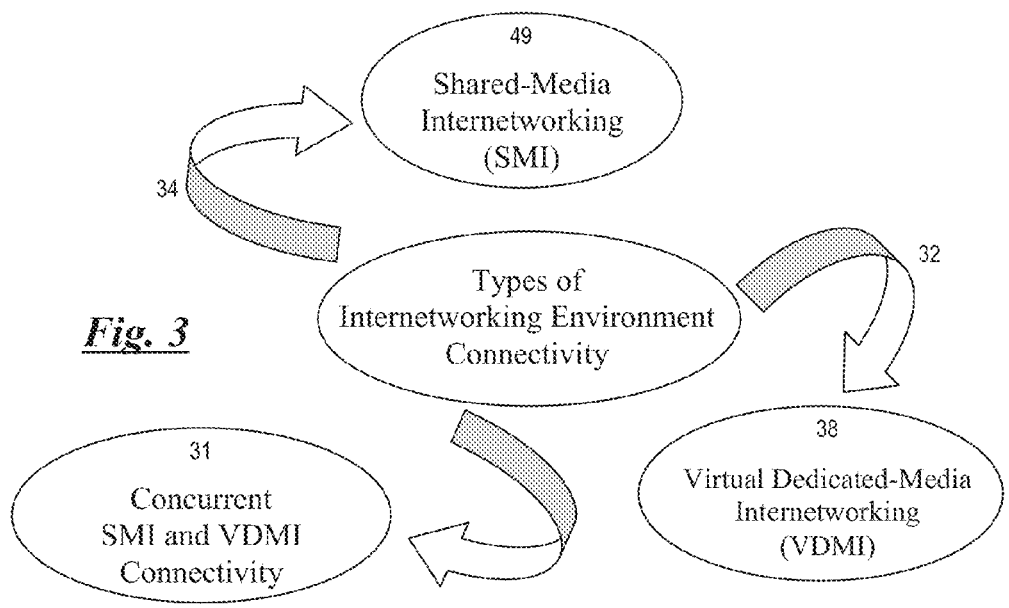
FIG. 3 depicts types of present embodiment internetworking environment connectivity.

FIGS. 2 and 3 illustrated the types of internetworking environment connectivity which present embodiment transceivers are able to support for further clarification. As shown, the connectivity topology type 34 is for subscription to shared-media internetworking environment, and the connectivity topology type 32 is for virtual dedicated-media internetworking environment (38). Also noted is the present embodiment ability to subscribe and support concurrent shared-media and virtual dedicate-media internetworking environment (38) which is the used of both types of topologies 34 and 32 or its equivalents.

Figure 4:
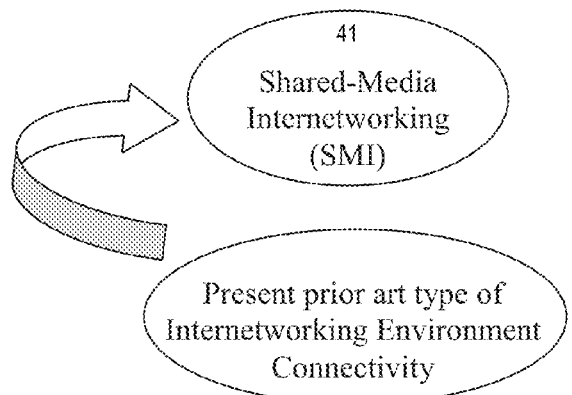
FIG. 4 depicts the key type of internetworking environment supported by prior art transceivers.
Figure 5:
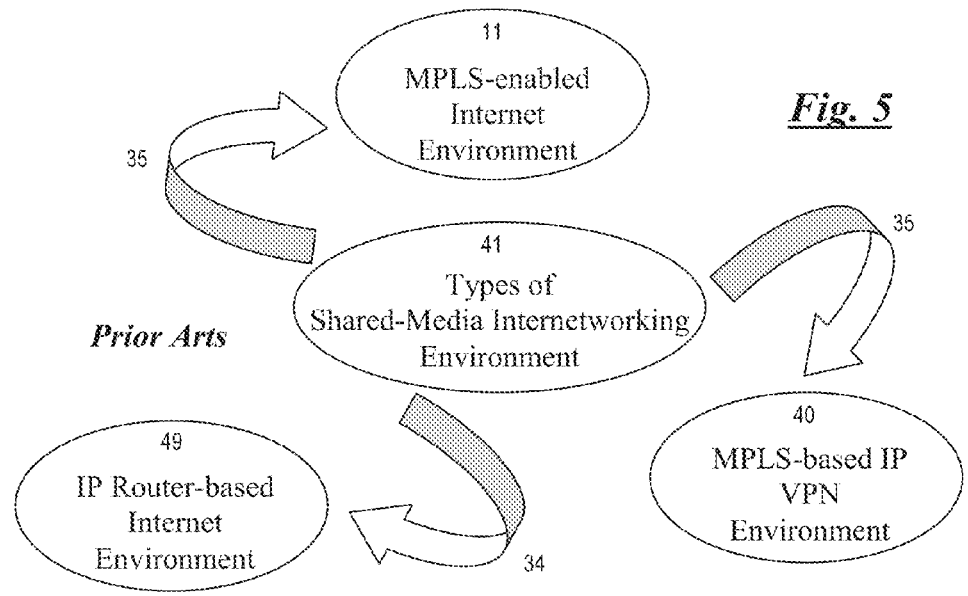
FIG. 5 depicts types of prior art internetworking environment and networking systems.

Unlike the present embodiment, prior art transceivers and network switches are able to support and subscribe only to share-media internetworking environment (41), as illustrated in FIG. 4. FIG. 5 depicts the types of existing prior art internetworking environments, encompassed within a shared-media internetworking environment (41), which are IP router-based Internet (49), MPLS-enabled Internet (11), and IP-based MPLS-enabled VPN (40) environments.

Figure 6:
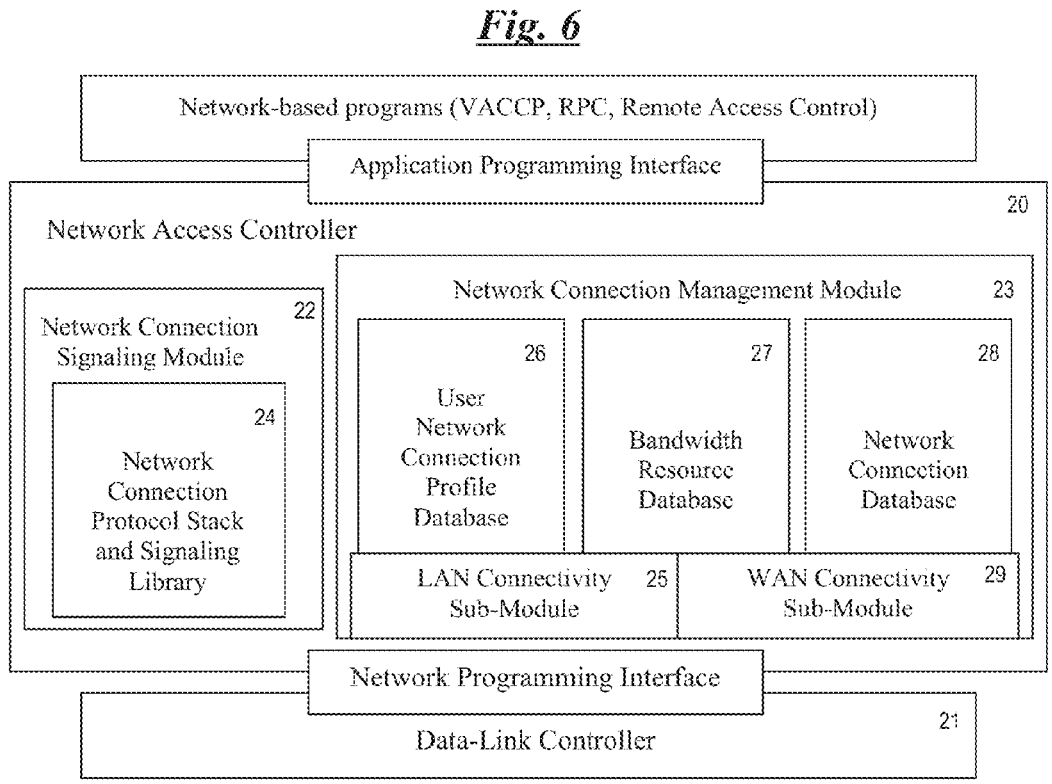
FIG. 6 is a block diagram illustrating the components of present embodiment network transceivers and switches for multimode internetworking system.

As illustrated in FIG. 6, the key components of SNE transceiver (12, 12a) are a programmable network data-link control means (21) and a programmable network access control means (20). Said network access control (20) is able to establish a plurality of transmission channels, through said data-link control (21), for receiving and transmitting of digital signal. Said network access control (20) is to manage the allocation of communication bandwidth or carrier bands to enable concurrent connectivity of a plurality of communication channels and sessions to a plurality of disparate internetworking systems and environment.

As shown, said network access control (20) comprises of a network connection protocol stack and signaling database module (22), and network connection management module (23). Said network connection management module (23) further comprises of a bandwidth resource database (27), a user network connection profile database (26) and a network connection database (28) component.

Said network connection signaling database module (22) containing a library of multiple network signaling and/or network access management procedural protocols (24). Said network access control (20) is able to subscribe for communication channel and session of connectionless and shared-media internetworking environment, and/or connection-oriented and VDU environment by using the appropriate signaling protocols from said network connection signaling database (22).

Said network connection management module (23) further comprises of a LAN connectivity sub-module (25) and a Wide Area Network (WAN) connectivity sub-module (29). LAN connectivity sub-module (25) only manages communication sessions among a plurality of sub-nets, while said WAN connectivity sub-module (29) manages external communication connections and sessions among a plurality of Internet Service Providers (ISP) and Application Service Providers (ASP).

Figure 7:
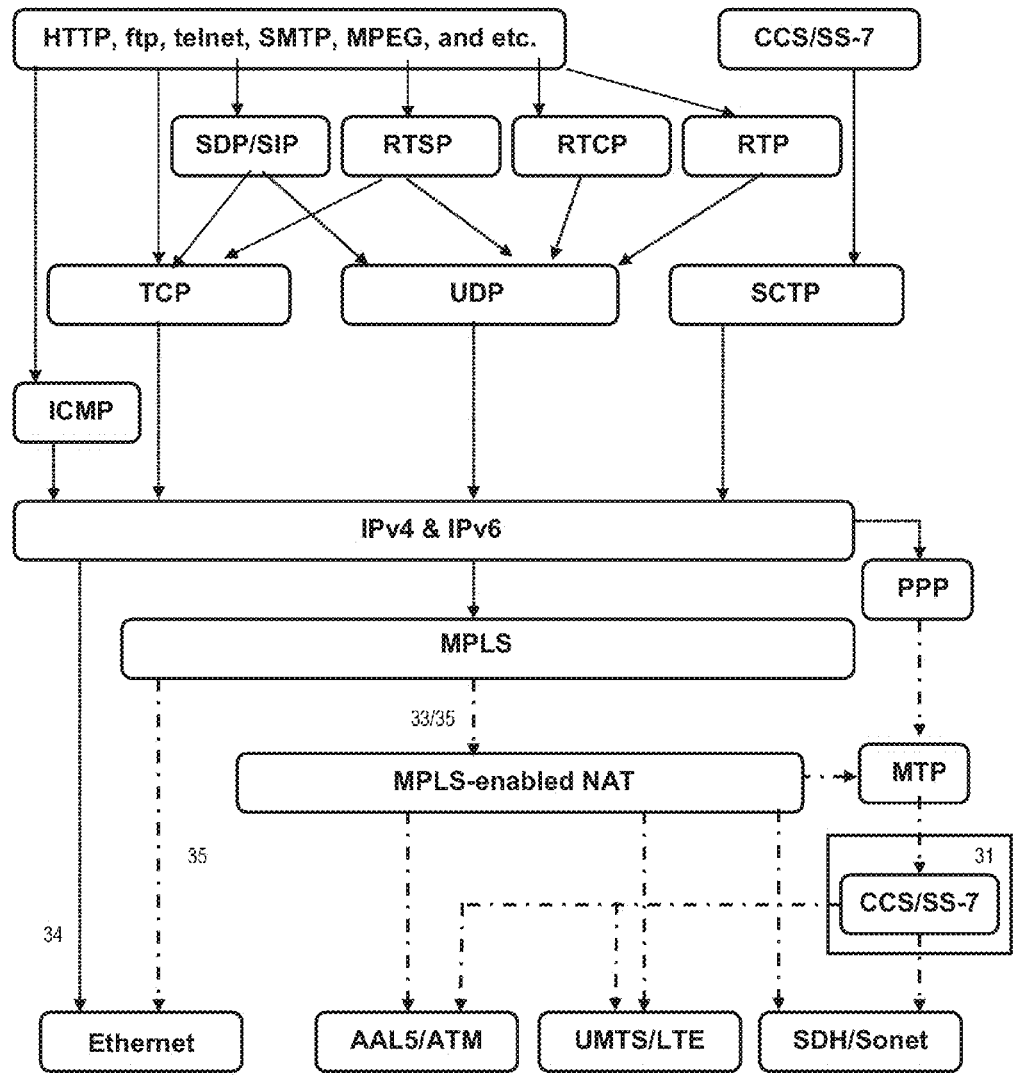
FIG. 7 depicts the network protocol components and the types of connectivity state-machines of present shared-media based internetworking environment supported by prior art embodiment.

FIG. 7 illustrated the types of network protocol components and the connectivity states of prior arts, supported by network routers, switches, and transceivers for enabling present shared-media internetworking environments as depicted in FIG. 5. As illustrated, application-layer programs, such as File Transfer Protocol (FTP), Simple Mail Transfer Protocol (SMTP) and the likes, communicate in a finite-state machine or connection-oriented manner, as indicated by solid line (32). For media-based application, said application may subscribe to compression programs, such as Moving Picture Experts Group (MPEG), MPEG-1 or MPEG-2 Audio Layer III (MP3), and the likes. Said applications also utilize signaling protocol, such as Media Gateway Control Protocol (Megaco), Session Description Protocol/Session Initiation Protocol (SDP/SIP), Real Time Streaming Protocol (RTSP) and the likes, for signaling, as well as for user transmission protocol means, such as Real-Time Transport Control Protocol (RTCP) and Real-Time Transport Protocol (RTP).

The latter protocols would then subscribe to transport-layer protocol such as Transmission Control Protocol (TCP), User Datagram Protocol (UDP) and Stream Control Transmission Protocol (SCTP). Whereas TOP and SCTP communication session are stately (connection-oriented). UDP is not. Presently all those transport-layer protocols are engineered to be hot-wired to IP. Since IP network-layer protocol operates in a stateless communication session, thus the communication session after IP is connectionless, as indicated by the dotted lines (34).

To enable faster routing of IP packets, Multiple Protocol Label Switching (MPLS) was developed to enable IP switching through network switches instead of router. With MPLS, Permanent Virtual Circuits (PVCs) are programmed to enable circuit-switching of IP packets, creating a hybrid transmission media of packet-switching and circuit-switching communication means, as indicated by the dashed and dotted lines (33/35). Said IP packets, through IP routers or MPLS-enabled IP switches, are then routed through transmission medium supporting Data Link-layer network protocols such as gigabit-Ethernet, Asynchronous Transfer Mode Adaptation Layer 5 (AAL5/ATM), Synchronous Optical Network (SONET), and the likes.

From the SNE perspective, it should be noted that whereas SNE end-node switch, whether it utilizes optical or electro-magnetic means for land-lines, is able to support multi-service provider communication channels, present xDSL devices are not able to do so. More importantly, as illustrated in FIG. 7, said communication channels and sessions only support a single internetworking environment, a shared-media internetworking, which is IP.

It should be noted that the backbone network system for the back office of all present VCC network central controller systems (31) operates using shared-media internetworking VPN, such as IP-enabled VPN. Thus, the vulnerable of VCC network central controller system (31) originated from the use of said IP system.

Figure 8:
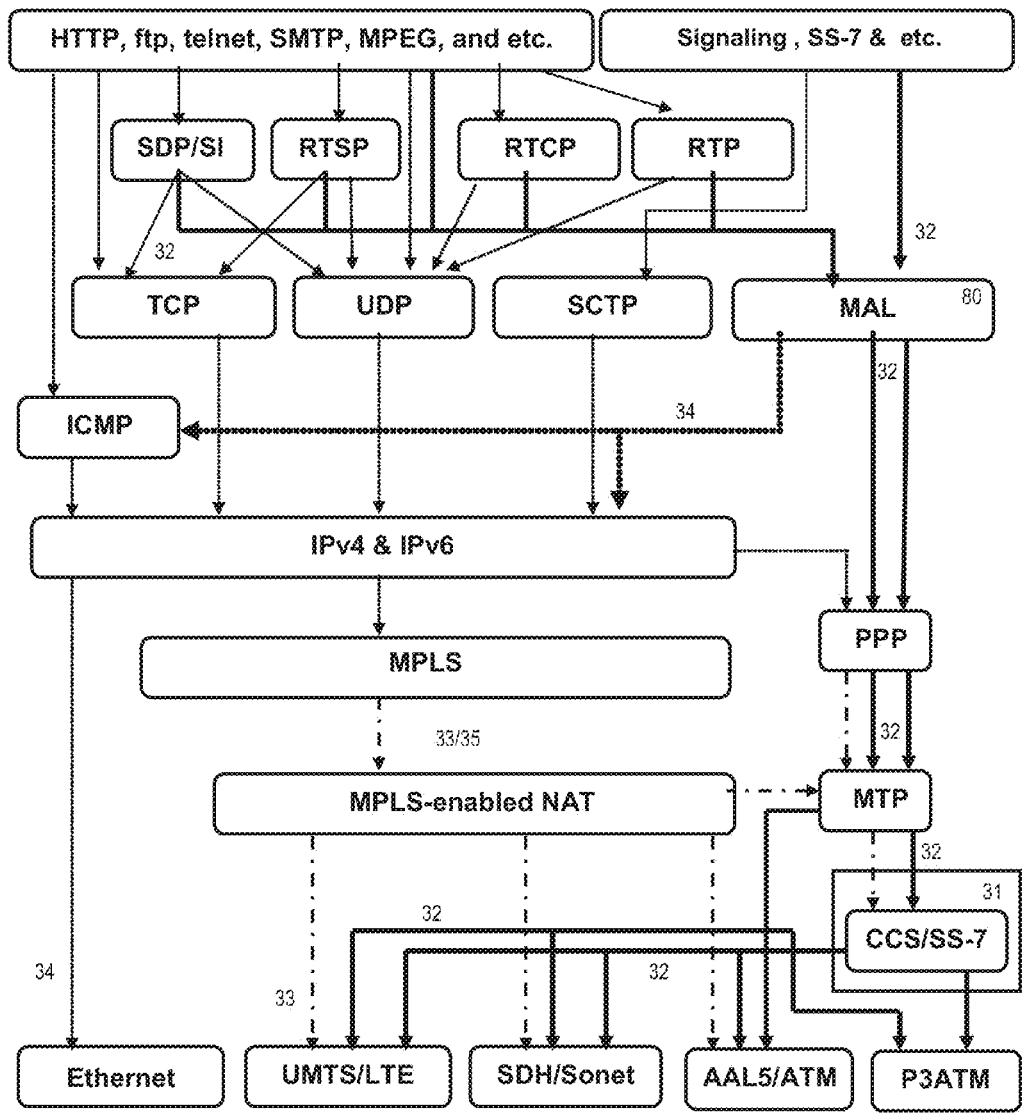
FIG. 8 depicts the network protocol components and the types of connectivity state-machines for both shared-media and virtual dedicated-media internetworking environments supported by present embodiment.

FIG. 8 depicts the types of network protocol components and the connectivity states of the present embodiment, supported by network routers, switches, and transceivers to enable a multimode internetworking environment, as illustrated in FIG. 3. As depicted, prior discussed communication sessions and channels associated with prior arts are still applicable.

What is unique and different about the communication sessions and channels from prior art is the use of Media Adaptation Layer (MAL) higher-layer network protocol (80). Unlike prior transport-layer protocols which are hot-wired to IP network protocol, MAL (80) is not. Instead, MAL (80) has a switching capability to subscribe to any transmission media or medium, depending upon what type of communication session been requested by the application-layer programs. This enables novel Internet-like application capability to operate natively on circuit-switching network systems.

For better understanding, let's view the differences from the perspective of secure transaction applications. Presently, using encryption and tunneling technology, secure transactions are conducted using firewall but still operates over packet-switching IP network environment. With MAL technology, it is possible to conduct secure transaction, using encryption and tunneling technology, over end-to-end connection-oriented and circuit-switching network topology, without having to traverse over any packet-switching networks at all, inclusive IP networks.

MAL higher-layer network protocol (80) has User Plane, Control Plane and Management Plane components. MAL's User Plane component enabled application-layer programs to interface and interconnect with it and subsequently to the subscribed lower-layer network protocol. MAL's Control Plane component control the interconnection and signaling with subscribed lower-layer network protocols while its Management Plane component governs and manages the types of interconnects be it with solely to connection-oriented and circuit-switched based transmission medium network protocols for VDMI environment, MPLS-enabled circuit-switching transmission medium with connectionless packet-switching IP transmission media environment, or a combination of both, concurrently.

As illustrated, MAL (80) has stately communication with application-layer programs, signaling protocols, and user transmission protocol means, as depicted by the bold solid lines (32). As shown, MAL (80) is able to support stateless communication session with ICMP and IP, as illustrated by the bold dotted lines (34), to IP transmission media. However, through PPP and Media Transfer Protocol (MTP), MAL is able to interface with stately transmission media systems such as Universal Mobile Telecommunications System/Long-Term Evolution (UMTS/LTE), AAL5/ATM, and etc. In this situation, MAL (80) is able to still maintain stately communication sessions to the underlying transmission mediums, as illustrated by the bold solid lines (32).

Also illustrated, with MAL network protocol (80), it is possible for said VCC network central controller system (31) internetworking capability to be entirely established using circuit-switching backbone network system topology, inclusive its back office. This eliminates the network security vulnerability arising from IP system topology, due to the absent of shared-media internetworking implementation. Said VCC network central controller system (31) and its back office system are now able to operate entirely under end-to-end, connection-oriented and circuit-switching communication channels using PVC scheme.

For internetworking data communication, most present prior arts Subscriber Network Equipment or Customer Equipment (CE) were engineered in "client-mode design" rather than in "server-mode design" for WAN connectivity. This is due to the lack of call establishment listening port mechanism for WAN Connectivity sub-module. With client-mode design prior art equipment were engineered with a specific source connectivity function since there is only one internetworking environment, and from a single service provider whom provides said connectivity to said Internet environment. The exception is been the narrow Integrated Services Digital Network (ISDN's) CE equipment which could enable the establishment of client-mode connectivity to the most two service providers. For better understanding, below shall be described a prior art xDSL embodiment, using client-mode model for establishing connectivity for Internet.

Figure 9:
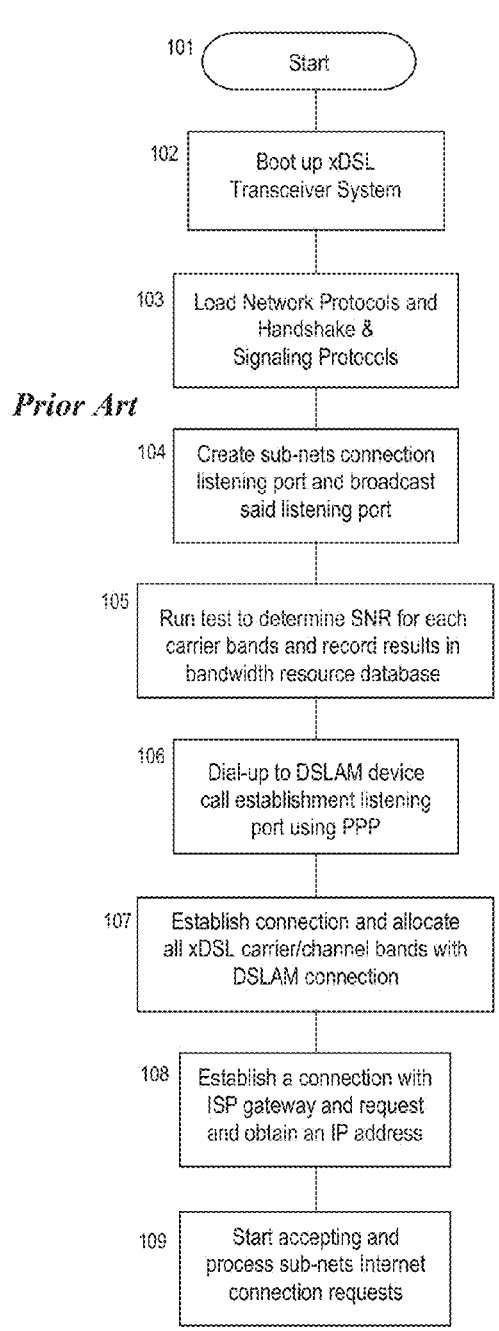
FIG. 9 is a flowchart for setting up prior art embodiment of single-mode connectivity to a single ISP service provider network gateway for shared-media IP environment using xDSL network devices.

FIG. 9 flowchart depicts the setting up procedures of prior art embodiment for single-mode connectivity to a single ISP service provider network gateway for shared-media IP environment using xDSL transceiver. On activation of prior art transceiver (44), step 101, the program boot up the operating system for said xDSL in step (102) to serve as a network access controller (NAC), and load the appropriate network protocols and handshake/signaling protocols in step (103). Upon complete, transceiver (44) could now be able to proceed to establishing a connection listening port in process (104) and broadcast its availability for providing interconnection and internetworking to its sub-nets.

Transceiver (44) would then activate step (105) which is the process for testing each carrier/channel bands to determine the Signal Noise Ratio (SNR) for each carrier band, and periodically thereafter. Said NAC records the result of its test within NAC's along with the allocated "bits per bin" for each channel band within its Bandwidth Resource database. Prior art Bandwidth Resource database usually contains fields for carrier band identification, SNR reading and "bit per bin" information only.

The transceiver (44) would then automatically proceed to step 106, and dial-up to DSLAM device call establishment listing port using Point-to-Point Protocol (PPP) to procure a connection for data transmission from transceiver to said DSLAM and subsequently to its subscribe ISP's Internet or VPN gateway through step (108). Upon success of said procurement of connection to said DSLAM, transceiver (44) would then allocate all its carrier/channel bands for said allocated connection with said DSLAM to procure Internet service from said ISP and request and obtained an IP address for its usage. Upon completion, transceiver (44) could now proceed to step (109), which is the process to start accepting and process sub-nets Internet connection requests for connectivity to the Internet or MPLS-enabled IP-based VPN.

Figure 10:
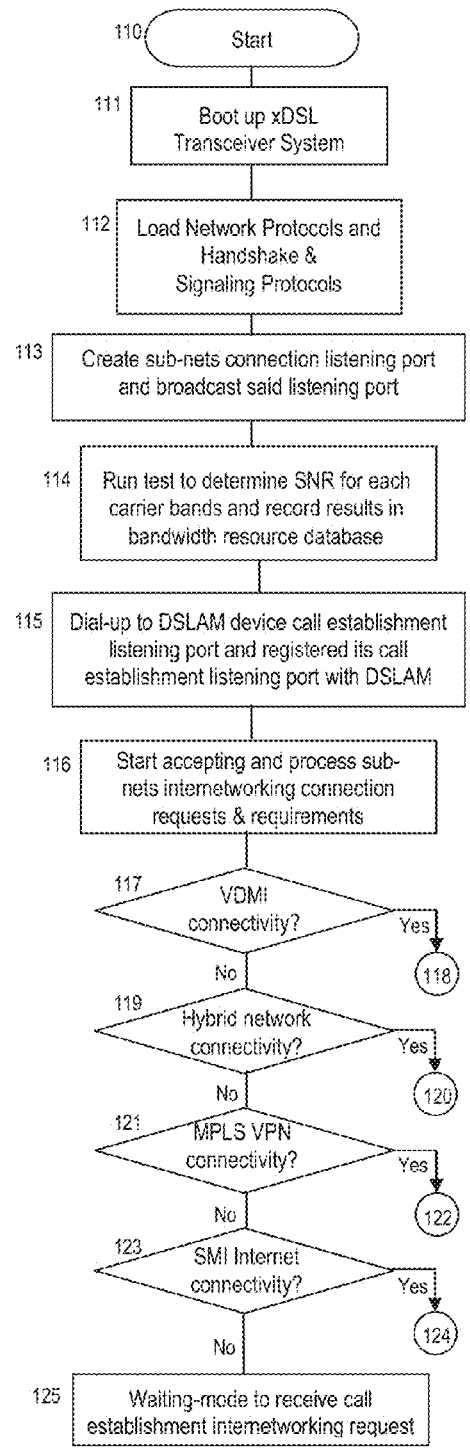
FIG. 10 flowchart depicts present embodiment process for setting up call/connection listening ports and multi-mode connectivity connections to a plurality of shared-media, hybrid network systems and dedicated-media service gateways, using multi-carrier bands or spectrums.

FIG. 10 flowchart depicts present embodiment process for setting up call and connection establishment listening ports for multi-mode connectivity connections to a plurality of shared-media and dedicated-media service gateways, using multi-carrier bands or spectrums. On activation of present embodiment transceiver (12a) in step 110, the program started boot-up transceiver's operating system in step 111 which serves as Network Access Control (NAC) means (20), and load the appropriate network protocols and handshake/signaling protocols in step 112.

Said transceiver (12a) utilizes said NAC (20) and its Data-Link Control (D-LC) (21) components, for the establishment of connections among its sub-net devices and/or to any external connected network devices. Upon complete, transceiver (12a) could now be able to proceed to establish a connection listening port process in step 113 and broadcast its availability for providing interconnection and internetworking to its sub-nets.

Transceiver (12a) would then activate step 114 process which tests each carrier/channel bands to determine the Signal Noise Ratio (SNR) for each carrier band, as well as periodically thereafter. Said NAC (20) records the result of its SNR test along with its allocated "bits per bin" for each channel band within its Bandwidth Resource database. Unlike prior art, present embodiment's Bandwidth Resource database (27) contains fields for carrier band identification, SNR reading, allocated "bits per bin" value, SNR rating, and a field to identified whether or not said carrier band had been in use.

Upon completion of step 115, said transceiver (12a) would dial-up to its interconnected DSLAM device's call establishment listening port and registered its call establishment listening port with said DSLAM (13). Upon successful completion of step 115, said transceiver's NAC (20) is now ready to start accepting and processing its sub-nets internetworking connection requests, as well as, requirements through step 116. Said transceiver (12a) NAC (20) then enquired its User Network Connection Profile database (26) to determine the type of interconnection and internetworking its allowed to support.

In the initial activation process 110 till completion of step 116, and without any constraint of interconnection and internetworking, said NAC proceed to step 117 which determine whether or not there is a need for establishing VDMI connectivity. If yes, the process then proceeds to step 118, otherwise it proceeds to step 119. In step 119, said NAC (20) determine whether or not there is a need for establishing hybrid network connectivity. If yes, the process then proceeds to step 120, otherwise it proceeds to step 121. In step 121, said NAC (20) determine whether or not there is a need for establishing MPLS-enabled VPN connectivity. If yes, the process then proceeds to step 122, otherwise it proceeds to step 123. In step 123, said NAC (20) determine whether or not there is a need for establishing connectivity to the Internet. If yes, the process then proceeds to step 124, otherwise it proceeds to step 125 whereby said NAC (20) is in a waiting-mode state to receive connection and call establishment requests for internetworking from its sub-nets or from external caller party.

Figure 11:
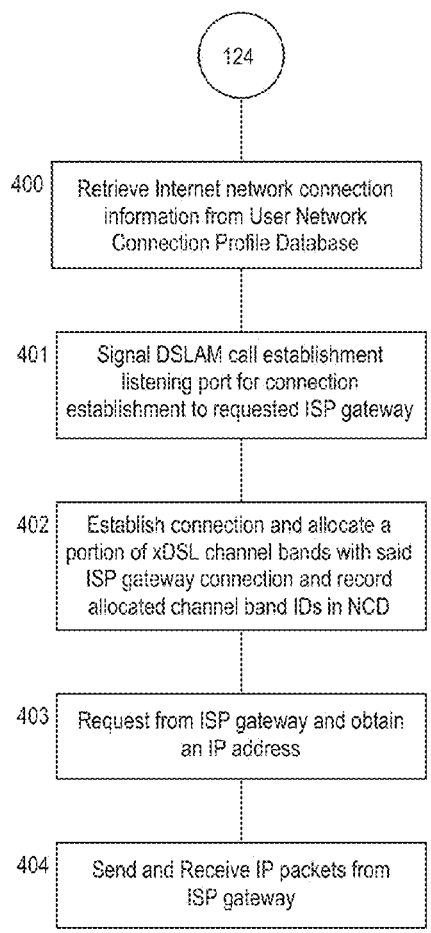
FIG. 11 flowchart depicts the method for the subscription and establishment of Internet services.

FIG. 11 flowchart depicts the method for the subscription and establishment of Internet services. Either from step 123 of transceiver (12a) activation process or a request from a sub-net device for Shared-Media Internet (SMI) Internet connectivity services, said NAC (20) proceed to step 124 which is to establish SMI connectivity from said transceiver (12a) through said DSLAM (13) to its subscribed ISP gateway. Upon receipt for step 124 process, said NAC retrieve Internet network connection information from its User Network Connection Profile database (26) in step 400 and proceed to step 401.

In step 401, said transceiver (12a) signal its interconnected DSLAM (13) call establishment listening port for connection establishment to the requested ISP gateway for a communication channel. Upon success of said procurement for connection to said DSLAM (13), transceiver (44) would then allocate the prescribe amount of either sequential range of carrier bands or carrier bands having low QoS classification for connectivity to said public Internet service via DSLAM and said ISP gateway to procure ISP for Internet services, and record said allocated channel band identification within its Network Connection database (28) in step 402. Said NAC (20) also request to obtain an IP address from ISP gateway for its usage in step 403. Upon success of step 403, NAC is now able to implement step 404, which is the ability to receive and send IP packets from its sub-net to its connected ISP gateway.

Figure 12:
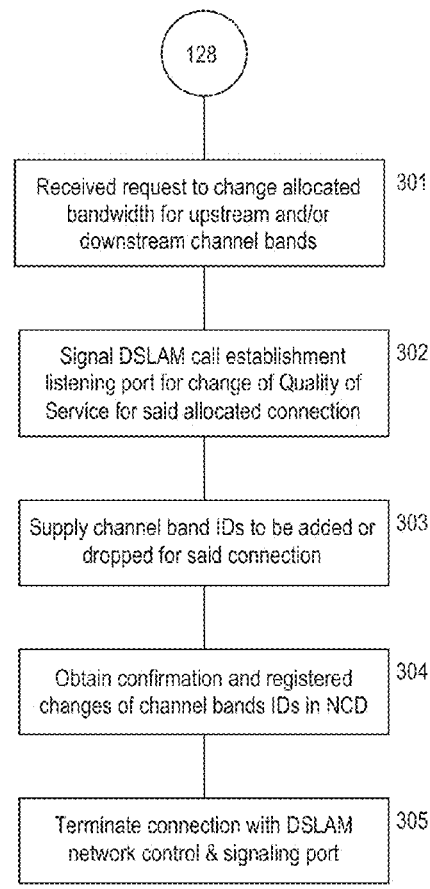
FIG. 12 depicts the xDSL algorithm flowchart for enabling the transceiver to change the allocated bandwidth resources of a connection.

Another unique feature the present embodiment had over prior art is the ability to increase and decrease the bandwidth allocated for the communication channels. FIG. 12 depicts the xDSL algorithm flowchart for enabling the transceiver to change the allocated bandwidth resource of a connection. Upon receipt of instruction for the need to increase or decrease the amount of bandwidth, said NAC (21) activated process (128).

When step 128 invocation/procedural call had been issued, step 301 evoked the process for processing the request to increase or decrease the allocated bandwidth for upstream and downstream channel bands. For increasing of bandwidth procedure, said NAC (20), with reference to bandwidth resource database (27), determine whether or not there is any available channel band to be allocated for the requested amount. If no, it informs the requester there is no available resources. If yes, it proceeds to step 302.

In step 302, said NAC (20) through said D-LC (21) signal to its interconnected DSLAM's call establishment listening port to request for change of Quality of Service (QoS) for said allocated transmission connection. On receipt of approval to change the bandwidth from said DSLAM (13), said transceiver (12a) invoke step 303, and supply the channel band IDs to be added or dropped for said connection. Upon obtaining conformation from said DSLAM (13) that said requested had been executed, said NAC (20) registered said changes in channel bands allocation by flagging or unflagging the "In-Use" data field for said channel band IDs in said Bandwidth Resource database (27) and registered said changed in allocated channel bands in its Network Connection database (28).

Upon completion of step 304, NAC (20) proceed to step 305, which implements the process to termination connection with said DSLAM (13) network control/signaling port for the undertaking of this process.

Figure 13:
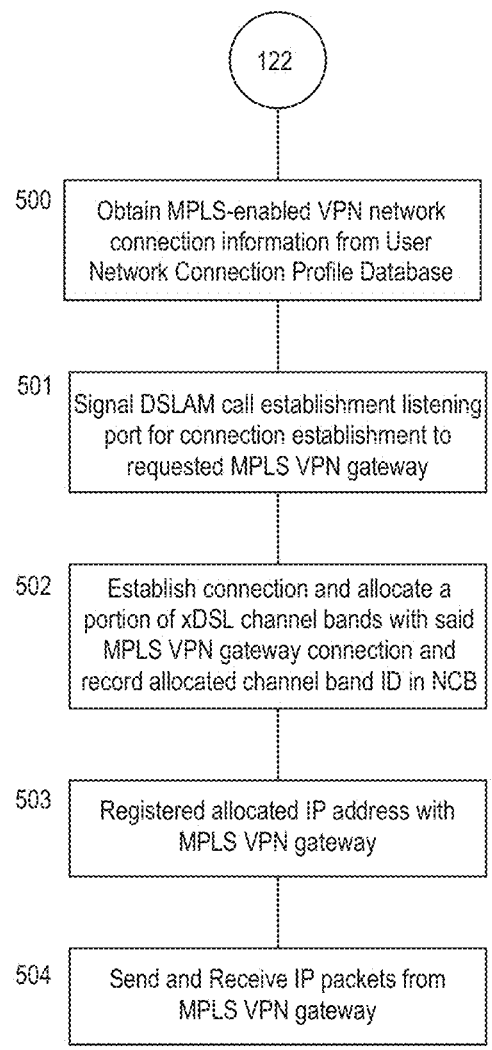
FIG. 13 flowchart depicts the method for the subscription and establishment of IP-based associative addressing-enabled VPN connectivity services.

FIG. 13 flowchart depicts the method for the subscription and establishment of IP-based associative addressing-enabled VPN connectivity services. Either from step 121 of transceiver (12a) activation process or upon a request from a sub-net device for MPLS-enabled VPN connectivity service, said NAC (20) proceed to step 122 which is to establish connectivity from said transceiver (12a) through said DSLAM (13) to its subscribed VPN gateway. Upon receipt of step 122's procedural call, said NAC (20) retrieves said MPLS-enabled VPN's network connection information from its User Network Connection Profile database (26) in step 500 and proceed to step 501.

In step 501, said transceiver (12a) signal its interconnected DSLAM's call establishment listening port to request for connection to the requested ISP gateway for a communication channel. Upon success of said procurement of connection to said DSLAM (13), transceiver (12a) would then allocate the prescribe amount of either sequential range of carrier bands or carrier bands having low to moderate QoS classification for said transmission channel connectivity via DSLAM to said MPLS-enabled VPN gateway to procure for secure Internet service from said VPN ISP, and record said allocated channel band identifications within its Network Connection database (28) in step 502. Said NAC (21) then registered its IP address with said MPLS-enabled VPN gateway for its usage in step 503.

At the MPLS-enabled VPN gateway, through used of tunneling methodology, said gateway associated said transceiver's IP address to its label or associative addressing and record said addressing information within its user/endpoint session translation database. The MPLS-enabled VPN gateway uses said user/endpoint session translation table for both address resolution, routing when inserting or removing said MPLS shim header for said transceiver IP packets. Said MPLS-enable VPN gateway, then encrypted and encapsulated said IP packets within another IP packet having MPLS associative addressing and route, through destination forwarding, through its label-swapping and circuit-switching based network. Upon success of step 503, NAC is now able to implement step 504, which is the ability to receive and send IP packets from its sub-net to its connected MPLS-enabled VPN gateway.

Its is normal, that a call establishment may originated from a circuit-switching network system, but the network system could either be end-to-end circuit-switching topology or an combination of circuit-switching and packet-switching network topology, such as 3G and 4G systems. If the interconnect comprises of a hybrid of packet and circuit switching systems then end-to-end, connection-oriented and circuit-switch internetworking environment does not exists. The below procedural flowcharts describe the process for determining and processing hybrid network and VDMI connectivity establishment.

Figure 14:
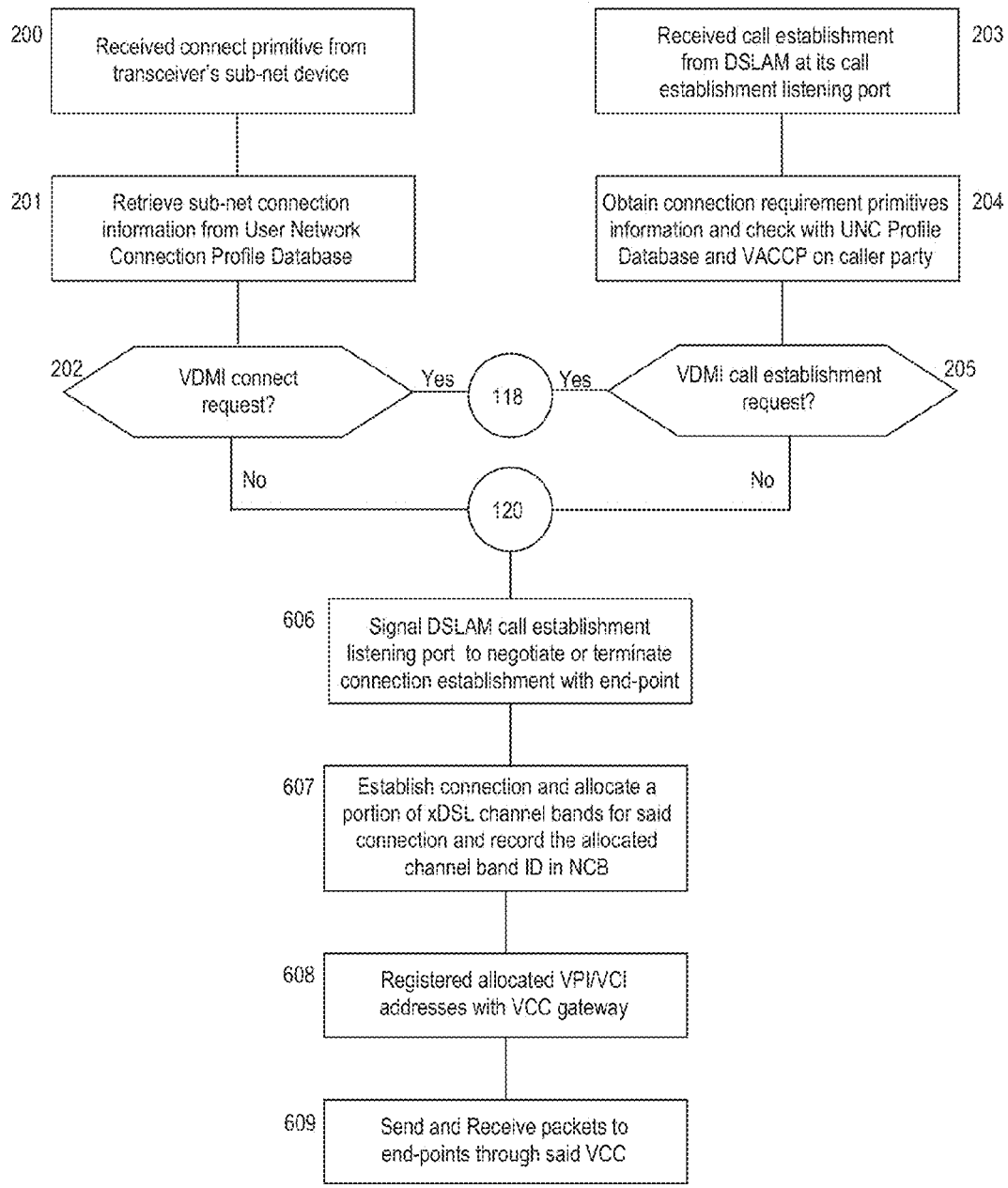
FIG. 14 flowchart depicts the method for the subscription and establishment of hybrid network system connectivity sessions among disparate connection-oriented and connectionless network system topology.
Figure 15:
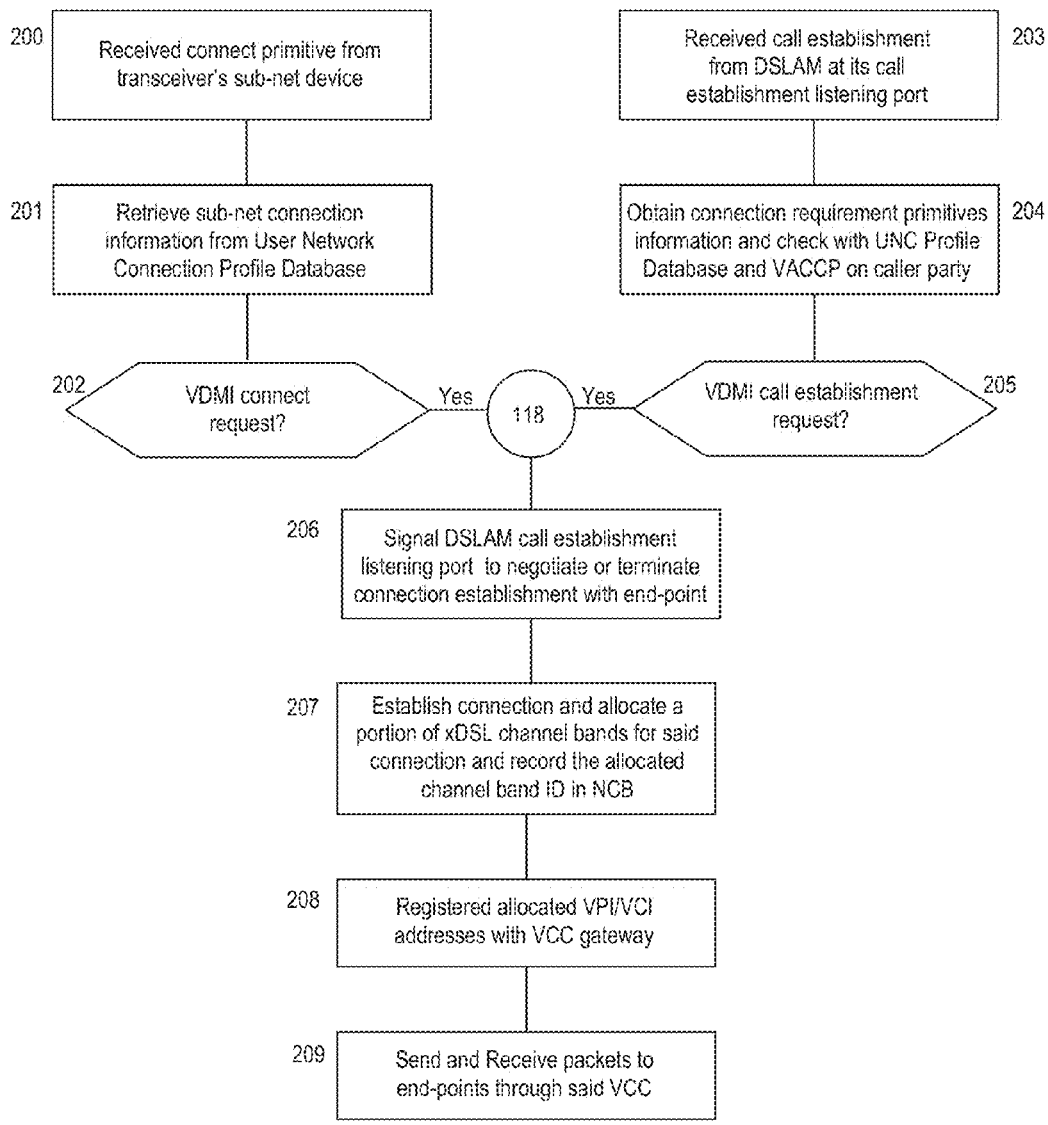
FIG. 15 flowchart depicts the method for the subscription and establishment of end-to-end, connection-oriented and circuit-switching connectivity for VDMI-based application services.

Present embodiment transceiver (12, 12a), operating in server-mode, have a registered call establishment listening port from it to the DSLAM and vise-verse. Step 200 to step 205, as illustrated in FIG. 14 and FIG. 15, are the process to implement such capability. Request for connect would originated from subscriber through invocation for connection to a called party in step 200, or from external through call establishment request from DSLAM through transceiver (12, 12a) call establishment listening port from a caller party in step 203.

Should the connection establishment origin from process 200, transceiver NAC (20) retrieve the requesting user/sub-net connection information from User Network Connection Profile database (27) and, if required, from Virtual Access Control Configuration Protocol database said requesting user/sub-net connection information. NAC (20) process said user/sub-net connection information to determine whether or not said user/sub-net is allow for connection to said called party, or whether or not the connection will utilizes for VDMI-based application. In step 202, should NAC determine the connection is for VDMI application, its route the process to step 118, otherwise the connection process is routed to 120.

FIG. 14 flowchart depicts the method for the subscription and establishment of hybrid network system connectivity sessions among disparate connection-oriented and connectionless network system topology. When the call establishment process is routed to step 120, NAC (20) through DL-C (21) signaled its connected DSLAM call establishment listening port to negotiate for connection to called party/endpoint, or, if caller party does not have access authority, said NAC (20) deny and terminate said call establishment in process 606. Should said connect was approved, NAC (20) activated process 607 to establish connection.

Upon success of said procurement of connection to said DSLAM, transceiver (12a) would then allocate the prescribe amount of either sequential range of carrier bands or carrier bands having moderate to high QoS classification to said called or caller party connection via DSLAM and said hybrid network systems, and record the allocated channel band identifications within its Network Connection database (28) in step 607. Said DSLAM through said VCC gateway would obtained and registered a Virtual Path Identifier/Virtual Circuit Identifier (VPI/VCI) address from said VCC network central controller or MPLS-enabled circuit-switching controller during process 608. Upon completion of step 608, the user/end-point is now able to send and receive information packets through said VCC channel/MPLS label-swapping circuit until terminated.

FIG. 15 flowchart depicts the method for the subscription and establishment of end-to-end, connection-oriented and circuit-switching connectivity for VDMI-based application services. When the call establishment process is routed to step 118, NAC (20) through DL-C (21) signaled its connected DSLAM call establishment listening port to negotiate for connection to said called party/endpoint, or, if caller party does not have access authority, said NAC (20) deny and terminate said call establishment in process 206. Should said connect was approved, NAC (20) activated process 207 to establish connection.

Upon success of said procurement of connection to said DSLAM, transceiver (12a) would then allocate the prescribe amount of either sequential range of carrier bands or carrier bands having high QoS transmission classification for connectivity to said called or caller party via DSLAM to an entirely end-to-end circuit-switching network system topology, and record the allocated channel band identifications within its Network Connection database (28) in step 207. Said DSLAM through said VCC gateway would obtained and registered a VPI/VCI address from said VCC network central controller during process 208. Upon completion of step 208, the user/end-point is now able to send and receive information packets through said VCC channel until terminate.

INDUSTRIAL APPLICABILITY

The invention finds utility in packet and circuit-switching network infrastructure for multimedia computing and communication connectivity to enable concurrent interaction among a plurality of service providers gateways and disparate internetworking environments and of for online applications and the likes.

Inasmuch as numerous derivative network system and infrastructure can be made using the preferred embodiment, such derivative network system may not depart from the spirit and scope of the industrial applicability. Whereas the present embodiment had been discussed herein as Subscriber Network Equipment (SNE), it finds equal usage as Provider Equipments (PE), such as network switches and the likes. In addition, herein describe the Network Access Controller's Network Control Management Module maintains discrete Network Connection, Bandwidth Resource and User Network Connection Profile database, this does not means there could not be an integration of those databases in part or whole. There is no intention to limit the applications of the invention to this exact disclosure of industrial applicability discussed herein. Most particularly, it is contemplated that this invention can be used with any communication and network system for electronic information connectivity and transmission whether it is wired and/or wireless medium-based network topologies.

The invention claimed is:

1. A system for providing multimode internetworking services comprising of a plurality of interconnected digital network systems and equipment having at least a transceiver, either as standalone or as multiplexer, for providing communication services to a plurality of subnet transceivers to support a plurality of Virtual Circuit Connections (VCC), said transceivers interface with public circuit-switching network systems through a combination of Digital Subscriber Line Access Multiplexer (DSLAM) having VCC network multiplexing means and mobile network having associative addressing enabled routing and multiplexing means, for interfacing with Internet Protocol IP network system, and is characterized by:

said system for providing multimode internetworking services provides multimode internetworking connectivity to a plurality of Internet Service Providers (ISPs) network gateways for providing Shared-Media Internetworking (SMI) services, and to at least an Application Service Provider (ASP) VCC-enabled network gateways for providing Virtual Dedicated-Media Internetworking (VDMI) services via respective digital network interfaces;

said transceiver support a plurality of network protocol stacks, have a programmable network data-link control means for establishing data-link connections, and a programmable network access controller having a network connection signaling database module, containing a library of network signaling and network access control procedures, and a network connection management module to enable said transceiver to subscribe for and managed a plurality of connectivity to connectionless SMI environment, and/or to end-to-end and connection-oriented VDMI environment;

said network connection management module having a user network connection profile database which contains records of user and network service profile information, a bandwidth resource database which contains connection identification and information of a transmission capability for each connection, and a network connection database which contains device addressing identifiers and connection identifiers;

said transceiver establishes a plurality of transmission channels for receiving and transmitting digital signal, and said transceiver's network access controller manages the allocation of VCC sessions and bandwidth, enabling concurrent connectivity for a plurality of communication sessions of disparate internetworking systems, environment, and applications, and record a VCC identifier and bandwidth within its network connection database;

said transceiver provides its subnet transceivers to concurrently subscribe for connectivity among a plurality of Service Providers (SP) network gateways for SMI and/or VDMI based internetworking environments via a combination of IP-based routers, associative addressing enabled network switching system, and VCC network system for a plurality for application services; and at least a VCC channel is allocated for network signaling purposes, and said network access controller establishes entirely end-to-end and connection-oriented communication session channels for a plurality of VDMI enabled application services, wherein a media adaptation layer (MAL) higher-layer network protocol is provided, wherein the MAL provides user plane, control plane, and management plane components, and the user plane component is configured to enable application-layer programs to interface and interconnect with the user plane component, and subsequently to the subscribed lower-layer network protocol, the control plane component controls the interconnection and signaling with the subscribed lower-layer network protocols, and the management plane component governs and manages the types of interconnects.

2. The system claimed in claim 1, wherein said network access controller create a listening port for establishing connections among its sub-net devices and broadcast its presence, and is further characterized by:

said network access controller signals to and subscribes from its data-link control means for the establishment of switched and non-switched connectivity channels or the establishment of dynamic and static connectivity channels and record the channels within its network connection database;

said data-link control means dynamically allocates communication channels and bandwidth allocation for downstream and upstream information traffics, to a plurality of disparate SMI systems and environment and record said connectivity channels and allocated bandwidth within said network connection and bandwidth resource databases, respectively;

said data-link control means dynamically allocates connectivity channels and bandwidth allocation, for downstream and upstream information traffic within a channel or through separate channels, for a plurality of VCC-enabled sessions for VDMI enabled applications and record said connectivity channels and allocated bandwidth within its network connection and bandwidth resource databases, respectively;

said transceiver is connected through a DSLAM switch coupled to a combination of associative addressing-enabled network systems and a VCC network system, and is subsequently connected to a plurality of network or application gateway systems to provide connectivity to SMI environment of public Internet, associative addressing-enabled Virtual Private Network (VPN) services, and/or VDMI environment, for network-based peer-to-peer and/or client-server applications;

said data-link control means of the transceiver communicates to a DSLAM, VCC network system, and VDMI's VCC-enabled application network gateway through VCC network central controller, or to IP-based and associative addressing switching-enabled network system of SMI network gateways, for the subscription and establishment of communication channels and sessions wherein:
  at least a communication channel allocated as listening port from the transceiver to a VCC network central controller for the use of network signaling by its network access controller to communicate with said VCC network central controller, and
  said listening port channel is used for call establishment in the setting up of static or dynamic and switch-based data-link connections and communication channels for application end-points via their respective gateways.

3. The system claimed in claim 2, and is further characterized by:
  said network access controller has a user network connection profile database, containing records of user and network service profile information for the establishment of multiple and differing communication channels of static and dynamic connections, said network access controller is operable to extract, receive and send user and network management information as subscribed by application, containing user and end-node identification information, called party information and connection bandwidth requirements for a required VCC channel from its sub-net transceivers;
  based upon a user and network service profile record from the user network connection profile database, said network access controller determine a type of static or dynamic connection requirement applicable to the required VCC channel and set requested access requirement parameters for said VCC channel and corresponding access channel identifiers and record the access parameters within its network connection and bandwidth resource databases; and network access control means analyzes the static or dynamic connection information based on an internetworking requirement to determine a user/caller identity, end-node location, end-device identity information, and user session information for dynamic allocation of static or dynamic connection configuration based on requested user session service information, and to provide to the network, the user session information for the configuration of said user/caller connectivity session for the requested internetworking environment and record connection session information within its network connection and bandwidth resource databases.

4. The system claimed in claim 3, and is further characterized by:
  said transceiver dynamically increases or decreases the bandwidth allocation amount for application data services, of the VCC system, wherein said transceiver's network access controller communicates with the VCC network central controller to dynamically negotiate and subscribe for the required bandwidth allocation for its internetworking application and record the changes within its bandwidth resource database.

5. The system claimed in claim 4, wherein said data-link control means establishes application end-point's data-link connection for a plurality of lower-layer network protocol system which uses connectionless and packet-routing scheme, and is further characterized by:
  said data-link control means establishes application end-point's data-link connections, by using a lower-layer connectionless network's handshake protocol procedures and schemes, concurrently to different service provider's gateways.

6. The system claimed in claim 5, whereby said transceiver's network access controller creates a listening port and broadcast to its subnet devices of its availability, and is further characterized by:
  said network access controller creates a call establishment listening port for dedicated-media enabled sub-nets, supporting Media Adaptation Layer (MAL) network protocol or any other higher-layer network protocol stack able to subscribes for establishment of connection-oriented VCC, as well as, for access authentication;
  said network access controller creates a call establishment listening port using a Permanent Virtual Circuit (PVC) or Switch Virtual Circuit (SVC), through a VCC-enabled DSLAM switch and VCC network system to the VCC network central controller for connectivity and communication with said VCC network central controller, and
  said call establishment listening port is allocated for the used of network signaling;
  during call establishment, said network access controller allocates an appropriate signaling protocol to its network data-link control means for establishing point-to-point connections for upstream and downstream communication channels from its transceiver to a requested network gateway, said network access controller allocates an appropriate handshake protocol of network control protocols or end-point signaling protocols or network programming interface primitives to its network data-link control means to establish a combination of SMI, associative addressing-enabled VPN, hybrid network system, or VDMI communication sessions among its sub-nets, which utilizes SMI, associative addressing-enabled VPN, hybrid network system, and VDMI network protocol, respectively, supported by SMI, associative addressing-enabled VPN, and VDMI network gateways in order for its network data-link control means to establish the required communication links among those devices;

said network access controller uses the user and network service profile information from its user network connection profile database, network access controller to govern the approval of connectivity for its plurality of sub-nets or end-users to a subscribed internetworking environment, and visa-versa; and said network access controller manages a plurality of VCC and allocates a portion of bandwidth for each VCC channel in order to provide concurrent connectivity for:
  public shared-media Internet session services;
  IP-based and associative addressing switching-enabled VPN session services;
  a hybrid network system connection session services among disparate connection-oriented and connectionless network systems; and
  end-to-end, connection-oriented, and VCC connectivity sessions for VDMI-based application services.

7. A method for establishing multimode Internet services, wherein the method includes:
  providing a network access controller to manage a plurality of Virtual Connection Circuit (VCC) sessions and allocating a portion of bandwidth for each VCC channel in order to provide concurrent connectivity for:
    public shared-media Internet session services;
    Internet Protocol (IP)-based and associative addressing switching-enabled VPN session services;
    a hybrid network system connection session services among disparate connection-oriented and connectionless network systems;
    end-to-end, connection-oriented, and VCC connectivity sessions for VDMI-based application services;
  providing communication between the network access controller and Virtual Connection Circuit (VCC) network central controller, through call establishment listening port, for establishing upstream and downstream connection channels from transceiver to an interface connected to an Internet Service Provider (ISP) network gateway for subscription of public Internet services;
  providing a network connection management module having a user network connection profile database, which contains records of user and network service profile information, a bandwidth resource database which contains connection identification and information of a transmission capability for each connection, and a network connection database which contains device addressing identifiers and connection identifiers, within said network access controller;
  allocating a portion amount of bandwidth resources for VCC communication channels between the transceiver and the ISP network gateway by said network access controller, upon receipt of approval and acceptance for the connection, and recording within a network connection database and bandwidth resource databases, the device addressing identifiers and associated VCC addressing identifiers of public circuit-switching networks and bandwidth rate allocated for upstream and downstream connectivity channels, and utilized information from the network connection database for allocating transmission services of communication session usage; and changing of the amount of allocated bandwidth dynamically by said network access controller for Internet service by using said network data-link control means to increase and decrease the allocated amount of bandwidth associated with upstream and downstream communication channels and recording changes in the amount of allocated bandwidth within its network connection database, and providing a media adaptation layer (MAL) higher-layer network protocol, wherein the MAL provides user plane, control plane, and management plane components, and
    the user plane component is configured to enable application-layer programs to interface and interconnect with the user plane component, and subsequently to the subscribed lower-layer network protocol,
    the control plane component controls the interconnection and signaling with the subscribed lower-layer network protocols, and
    the management plane component governs and manages the types of interconnects.

8. The method for the establishment of multimode Internet services claimed in claim 7, wherein providing connectivity for IP-based and associative addressing-enabled virtual private network (VPN) connectivity session services further comprises:
  using call establishment listening port to communicate between said network access controller and VCC network central controller, upon receipt of connection request from shared-media enabled sub-nets for VPN services, to establish connectivity to subscribed IP-based and associative addressing switching-enabled network gateway for the subscription of IP-based and associative addressing switching-enabled VPN service;
  allocating a portion of the amount of bandwidth by said network access controller, upon receipt of approval and acceptance for the connection, to the VCC channel for the connection to the VPN services and recording, within its network connection and bandwidth resource databases, the device addressing identifiers and associated VCC addressing identifier of the public circuit switching network and the bandwidth rate allocated for the upstream and downstream connectivity channels, and utilizing the information from its network connection database for transmission services of said communication session usage; and
  changing, dynamically, the amount of allocated bandwidth for the VPN service by said network access controller for its data-link control means to increase and decrease the allocated amount of bandwidth, associated with the upstream and downstream communication channels allocated for the VPN service and recording the changes within its network connection database.

9. The method for the establishment of multimode Internet services claimed in claim 7, wherein providing connectivity for hybrid network system connectivity sessions among disparate connection-oriented and connectionless network systems further comprises:
  providing a call establishment listening port for said network access controller to communicate with the VCC network central controller, upon receipt of connection request from dedicated-media sub-nets for connectivity services without request for end-to-end dedicated-media connectivity for establishment of connectivity to a subscribed Network Service Provider's (NSP) having associative addressing-enabled hybrid network gateway for the subscription of IP-based and associative addressing switching and address resolution enabled hybrid network connectivity services;

allocating the prescribed amount of bandwidth for the hybrid network system connectivity session among the disparate connection-oriented and connectionless network systems by said network access controller, upon receipt of approval and acceptance for the connection, and recording within its network connection and bandwidth resource databases the device addressing identifiers and the associated VCC addressing identifier of the public circuit-switching networks and the bandwidth rate allocated for the upstream and downstream communication channels, and utilizing the information from its network connection database for providing transmission services of the communication session.

10. The method for the establishment of multimode Internet services claimed in claim 7, wherein providing connectivity for end-to-end, connection-oriented and circuit-switching connectivity for Virtual Dedicated-Media Internetworking (VDMI) based application services further comprises:

utilizing Media Adaptation Layer's (MAL) associative addressing by said network access controller for routing, multiplexing, and address resolution services;

allocating appropriate signaling protocols by said network access controller to its network data link control means for establishing VCC communication channels from transceiver to VDMI Application Service Provider's (ASP's) VCC gateway and end-point devices, for establishment of VDMI communication sessions among its sub-nets, ASP having a MAL-enabled network gateway, and ASP's MAL-enabled network gateway, which also implements a MAL associative addressing scheme for destination forwarding, multiplexing, and address resolution capabilities;

providing a call establishment listening port for said network access controller to communicate with VCC network central controller, upon receipt of connectivity request from VDMI enabled sub-nets for end-to-end and dedicated-media communication, for the establishment of end-to-end VCC connectivity to the subscribed ASP network gateway or to the called end-point device, supporting MAL network protocol or any other higher-layer network protocol stack capable of subscribing for end-to-end, connection-oriented and dedicated-media network communication session services;

allocating a prescribed amount of bandwidth by said network access controller for end-to-end connection-oriented and dedicated-media communication session among a plurality of VCC network devices;

recording within its network connection and bandwidth resource databases of said network access controller, upon receipt of approval and acceptance for said VDMI connection, the device addressing identifiers and the associated VCC addressing identifier of the public circuit-switching networks and the bandwidth rate allocated for the upstream and downstream communication channels, and utilizing the information from its network connection and bandwidth resource databases for transmission services for and during said communication session; and dynamically changing the amount of subscribed bandwidth allocated for the VDMI service by said network access controller to its data-link control means to increase and decrease the allocated amount of bandwidth, associated with the communication channels allocated for the VDMI service and recording the changes within its bandwidth resource database.

11. A system for providing multimode internetworking communication services comprising a plurality of interconnected digital network systems, having at least a Subscriber Network Equipment (SNE) transceiver functioning either as standalone or as multiplexer, providing connectivity for a plurality of its sub-net transceivers, through wired or wireless means, said SNE transceiver is connected through a combination of mobile network, Digital Subscriber Line Access Multiplexer (DSLAM), Virtual Connection Circuit (VCC) multiplexing means, associative addressing switching-enabled shared-media network system, and VCC circuit-switching network system;

said SNE transceiver supports a plurality of carrier bands/spectrum for digital signal transmissions, said SNE transceiver, upon activation and periodically thereafter, to polls the plurality of digital signal carrier bands to determine a quality of a transmission capability, based upon Signal-Noise Ratio (SNR) ratings of each carrier band and records the resultant information of the quality of transmission capability for each carrier band in its bandwidth resource database, the digital carrier bands are able to support a plurality of transmission channels of half-duplex and/or full duplex communication sessions, said SNE transceiver having multiplexing/demultiplexing means for the transmission of multimedia information, said SNE transceiver having a programmable network data-link control means, and is characterized by:

said network data-link control means establishes connection-oriented and/or connectionless internetworking data-link connections;

said SNE transceiver having a programmable network access controller able to establish a plurality of transmission channels, through its data-link control means, for receiving and transmitting digital signal and to manage allocation of the digital carrier bands to enable concurrent connectivity for a plurality of communication channels and sessions to a plurality of disparate internetworking systems and environment by providing connectivity through a combination of IP-based and associative addressing switch-enabled network gateways to more than one Internet Service Providers (ISPs), and/or to a plurality of VDMI-enabled Application Service Providers (ASPs) gateway, via digital interfaces;

at least a digital carrier band allocated for network signaling function;

said network access controller have a network connection signaling database module containing library of multiple network signaling and network control, management procedural protocols, and a network connection management module having a user network connection profile database which contains records of user and network service profile information, a bandwidth resource database which contains connection carrier band identification and information of a quality of transmission capability for each carrier band, and a network connection database which contains device addressing identifiers and connection identifiers; and said network access controller utilizes its network connection signaling database module and network connection management module to subscribe to and manage a plurality of communication channel and session of connectionless, shared-media internetworking environment, and/or connection-oriented and Virtual Dedicated-Media Internetworking, VDMI environment,
wherein a media adaptation layer (MAL) higher-layer network protocol is provided, wherein the MAL provides user plane, control plane, and management plane components, and
the user plane component is configured to enable application-layer programs to interface and interconnect with the user plane component, and subsequently to the subscribed lower-layer network protocol,
the control plane component controls the interconnection and signaling with the subscribed lower-layer network protocols, and
the management plane component governs and manages the types of interconnects.

12. The system claimed in claim 11, wherein said network access controller creates a listening port for establishing connections among its sub-net devices and broadcast its presence, and is further characterized by:
said network access controller signals to and subscribe from its data-link control means for the establishment of both switched/dynamic and non-switched/static transmission channels and record the types of connectivity channels within its network connection database;
said network data-link control means dynamically allocates half-duplex or full-duplex connectivity channels, for downstream and upstream information traffics, to a plurality of disparate Shared-Media Internetworking (SMI) network systems and environments, and/or a plurality of VCC-enabled sessions for VDMI enabled applications environment and record the connectivity channels and allocated bandwidth within its network connection and bandwidth resource databases, respectively;
said SNE transceiver is connected through a DSLAM which is coupled to a combination of associative addressing switching-enabled network emulation gateway system and to VCC network system, and is subsequently connected to a plurality of network or application gateway systems to provide connectivity for SMI environment of public Internet services using IP routers, Virtual Private Network (VPN) services using associative addressing switching-enabled IP switches; and Virtual Dedicated Media Internetworking (VDMI) environment to a plurality of VCC application gateways to provide for connection-oriented peer-to-peer client/server applications;
said network access controller through its network data-link control means communicates and negotiate with the VCC network central controller and MPLS-enabled network gateway and system, through DSLAM, for the subscription and establishment of connectivity channels and sessions wherein:
at least a communication channel allocated as listening port is established from the SNE transceiver to the VCC network central controllers of the VCC network system and MPLS-enabled network systems for the use of network signaling by network access controller to communicate with the VCC and MPLS network central controller; and
said listening port channel is used for call establishment in the setting up of static and/or dynamic and switch-based data-link connections and communication channels via their respective gateways.

13. The system claimed in claim 12, and is further characterized by:

said network access controller having a user network connection profile database containing records of user and network service profile information for establishing multiple and differing communication channels of static and dynamic connections, network access controller having processing logic operations to extract, receive and send user and network management information, as subscribed by application, containing user and end-node identification information, called party information and connection service requirements for a required communication channel from User Premise Devices (UPD) transceivers; wherein
based upon the user and network service profile record from its user network connection profile database, said network access controller having access parameter setting logic to determine the type of static and/or dynamic connection requirements applicable for the requested connection and set the requested access requirement parameters for the allocated transmission carrier bands and record connection identifiers, types access parameters and transmission carrier band identifiers within its network connection database and bandwidth resource database; and
having means to analyze static or dynamic connection information based on an internetworking requirements, to determine user/caller identity, end-node location, end-device identity information, and user session information for dynamic allocation of static and/or dynamic connection configuration based on requested user session service information, and to provide to a network, user session information for configuration of a user/caller connectivity session for the requested internetworking environment and record connectivity information within its network connection and bandwidth resource databases.

14. The system as claimed in claim 13, and is further characterized by:
said network access controller, through its data-link control means, dynamically increases or decreases the numbers of carrier bands allocated for the use of the required SMI and VDMI applications and record the changes within its network connection and bandwidth resource databases.

15. The system claimed in claim 14, wherein said data-link control means having network signaling procedures to enable establishment of application end-point's data-link connection for a plurality of lower-layer network protocol system which uses connectionless and packet-based routing scheme, and is further characterized by:
said data-link control means utilizes the required signaling and network access management procedural protocol contained in the network connection signaling database module to enable establishment of application end-point's data-link connections, and utilizes said lower-layer connectionless network's handshake protocol procedures and scheme, concurrently to different service provider's gateways.

16. The system claimed in claim 15, whereby in activation of SNE transceiver, its network access controller creates a listening port and broadcast to shared-media enabled sub-net devices of its availability, and is further characterized by:
said network access controller creates a call establishment listening port for dedicated-media enabled sub-nets, supporting Media Adaptation Layer MAL network protocol or any higher-layer network protocol stacks to subscribes for the establishment of connection-oriented VCC and for access authentication;

said network access controller creates a call establishment listening port, using a Permanent Virtual Circuit (PVC) or Switch Virtual Circuit (SVC), through a VCC-enabled DSLAM switch and VCC network switches to the VCC network central controller for connectivity and communication with the VCC center controller, and said network access controller allocated a carrier band with high quality of the transmission capability for the call establishment listening port transmission channel allocated for the use of network signaling purposes;

during call establishment, said network access controller allocated an appropriate signaling protocol to its data-link control for establishment of point-to-point connections for upstream and downstream communication channels from its SNE transceiver to a requested network gateway, said network access Controller allocates an appropriate handshake protocol of network control protocols and/or end-point signaling protocols/network programming interface primitives to its data-link control for the establishment of a combination of Shared-Media Internetworking (SMI), associative addressing-enabled VPN, hybrid network system, and Virtual Dedicated-Media Internetworking (VDMI) communication sessions among its sub-nets, which utilizes SMI associative addressing-enabled VPN, hybrid network system, and/or VDMI network protocol, respectively, supported by the SMI, associative addressing-enabled VPN, and VDMI network gateways in order for its data-link control to establish the required communication links among interconnected devices;

said network access controller uses the user and network service profile information from its user network connection profile database for its network access controller to govern the approval for connectivity of its plurality of sub-nets and/or end-users to the subscribed internetworking environment, and visa-versa; and said network access controller manages and portions multiple amount carrier bands allocated for each connection session in order to provide concurrent connectivity for:
  public and shared-media Internet session services;
  IP-based and associative addressing switching-enabled Virtual Private Network (VPN) session services;
  hybrid network system connection sessions services among disparate connection-oriented and connectionless network systems; and
  end-to-end, connection-oriented, and VCC connectivity sessions for VDMI-based application connection services.

17. A method for establishing multimode Internet connectivity session services, wherein the method includes:
  providing a network access controller to manage and to portion multiple amount carrier bands allocated for each connection session in order to provide concurrent connectivity for:
    public and shared-media Internet session services;
    Internet Protocol (IP)-based and associative addressing switching-enabled Virtual Private Network (VPN) session services;
    hybrid network system connection sessions services among disparate connection-oriented and connectionless network systems;
    end-to-end, connection-oriented, and Virtual Circuit Connection (VCC) connectivity sessions for VDMI-based application connection services;
  providing call establishment listening port for said network access controller to communicate with Virtual Connection Circuit (VCC) network central controller for establishment of connection, through a VCC-enabled Digital Subscriber Line Access Multiplexer (DSLAM) having means to connect to an Internet Service Provider (ISP) network gateway for the subscription of public and shared-media Internetworking services;
  allocating appropriate handshake protocols of Shared-Media Internetworking's (SMI's) control protocol from said network access controller to data-link control means for the establishment SMI communication sessions among its sub-nets which utilizes the SMI network protocol, supported by the SMI network gateway, for its data-link control means to establish communication links among interconnected devices;
  providing a network connection management module having a user network connection profile database which contains records of user and network service profile information, a bandwidth resource database which contains connection carrier band identification and information of a quality of transmission capability for each carrier band, and a network connection database which contains device addressing identifiers and connection identifiers, within said network access controller;
  upon receipt of approval and acceptance for the connectivity, network access control means allocates prescribe amount of either sequential range of carrier bands or carrier bands having low quality of transmission classification for connectivity to public Internet service via DSLAM and ISP network gateway, and record within its network connection database the device addressing identifiers and connection identifier along with the associated carrier band identifiers allocated for upstream and downstream communication channels and utilized information from network connection database for transmission services for and during said SMI communication session usage; and
  changing dynamically the amount of carrier bands by said network access controller for Internet service by using its data-link control means to increase and decrease the allocated amount of carrier bands associated with the upstream and downstream communication channels record changes in the amount of carrier bands within its network connection databases, and
  providing a media adaptation layer (MAL) higher-layer network protocol, wherein the MAL provides user plane, control plane, and management plane components, and
    the user plane component is configured to enable application-layer programs to interface and interconnect with the user plane component, and subsequently to the subscribed lower-layer network protocol,
    the control plane component controls the interconnection and signaling with the subscribed lower-layer network protocols, and
    the management plane component governs and manages the types of interconnects.

18. The method claimed in claim 17, the method further comprising:
  providing a call establishment listening port for said network access controller to communicate through to with the VCC network central controller for establishing connectivity to a VCC-enabled DSLAM having means to connect to an Internet Protocol (IP)-based and associative addressing switching-enabled VPN network gateway for the subscription of the communication services;

allocating the appropriate handshake protocols of Shared-Media Internetworking's (SMI's) control protocol from said network access controller to its data-link control means for establishing SMI communication sessions among its sub-nets which utilizes the SMI network protocol, supported by the VPN network gateway, for said data-link control means to establish communication links among network devices;

allocating a prescribed amount of either sequential range of carrier bands or carrier bands having low to moderate quality of SNR transmission classification for said network access controller, upon receipt of approval and acceptance of connection, for connectivity to the VPN service, and record within its network connection database the device addressing identifiers and connection identifier along with associated carrier band identifiers allocated for the upstream and downstream communication channels and utilized said information from said network connection database for transmission services for and during said communication session usage; and changing the amount of carrier bands, dynamically, by said network access controller, of the carrier bands allocated for an Internet service by using its data-link control means to increase and decrease the allocated amount of carrier bands associated with the upstream and downstream communication channels record the changes within its network connection databases.

19. The method claimed in claim 17, wherein the subscription and establishment of hybrid network system connectivity sessions among disparate connection-oriented and connectionless network systems further comprises:

allocating an appropriate control protocol's handshake protocols and associative addressing network protocol signaling by said network access controller, upon receipt of connection request from its dedicated-media enabled sub-nets for communication services without request for end-to-end dedicated-media connection, to its data-link control means for the establishment of communication sessions among its sub-nets with the associative addressing-enabled hybrid network gateway;

providing a call establishment listening port for said network access controller to communicate with the VCC network central controller for establishing of a connection to the subscribed Network Service Provider's (NSP) having hybrid-based network gateway for the subscription of IP-based and associative addressing routing and address resolution enabled hybrid internetworking connectivity services;

allocating the prescribed amount of either sequential range of carrier bands or carrier bands having moderate to high quality of SNR transmission classification for hybrid network system connectivity session, among the disparate connection-oriented and connectionless network systems, by network access controller upon receipt of approval and acceptance of the connection to its data-link control means and to record the connection information within its network connection database the device addressing identifiers and the associated carrier band identifiers allocated for the upstream and downstream communication channels and utilized the information from its network connection database for transmission services for and during said multimode internetworking communication session.

20. The method claimed in claim 17, the method further comprising:

providing a call establishment listening port for said network access controller, upon receipt of connection request from its virtual dedicated-media enabled sub-nets for connectivity services with request for end-to-end dedicated media connection, to communicate with the VCC network central controller for establishing an end-to-end VCC connection to a subscribed Application Service Provider's (ASP) network gateway, the network gateway being MAL enabled, or to a called end-point device supporting a virtual dedicated-media enabled network protocol, such as Media Adaptation Layer (MAL) network protocol or other higher-layer network protocol stacks having capability to subscribe for end-to-end connection-oriented and circuit-switching dedicated-media network communication session services;

providing network access controller to utilize MAL's or said other higher-layer network protocol's associative addressing for destination forwarding, multiplexing, and address resolution services;

allocating a prescribed amount of either sequential range of carrier bands or carrier bands having high quality SNR transmission classification by said network access controller, upon receipt of approval and acceptance for connection said SNE transceiver to the ASP's VCC interface and/or end-point device, for an end-to-end connection-oriented and circuit-switching dedicated-media communication session among a plurality of VCC network devices and record the connection resources within its network connection database;

allocating the appropriate signaling protocols/network programming primitives for MAL or said other higher-layer network protocol's control protocol, for signaling, by said network access controller to its data-link control means for establishing VDMI communication sessions among its sub-nets, which utilizes MAL or said other higher-layer network protocol, to the ASP's MAL-enabled network gateway, implementing end-to-end connection-oriented and circuit-switching for destination forwarding, multiplexing, and address resolution capabilities;

recording within its network connection database of said network access controller, upon receipt of approval and acceptance for the connection, device addressing identifiers and associated carrier band identifiers allocated for the upstream and downstream communication channels and utilized the information from its network connection database for transmission services for and during said communication session; and changing the amount of carrier bands allocated dynamically by said network access controller, allocated for VDMI service, by using its data-link control means to increase and decrease the allocated amount of carrier bands associated with the upstream and downstream communication channels and records the changes within its network connection databases.

21. The system of claim 1, wherein the MAL is not hard-wired to an IP network protocol, and thereby provides switching capability to subscribe to any transmission media or medium depending upon the type of communication session requested by an application-layer program.

22. The method of claim 7, wherein the MAL is not hard-wired to an IP network protocol, and thereby provides switching capability to subscribe to any transmission media or medium depending upon the type of communication session requested by an application-layer program.

23. The system of claim 11, wherein the MAL is not hard-wired to an IP network protocol, and thereby provides switching capability to subscribe to any transmission media or medium depending upon the type of communication session requested by an application-layer program.

24. The method of claim 17, wherein the MAL is not hard-wired to an IP network protocol, and thereby provides switching capability to subscribe to any transmission media or medium depending upon the type of communication session requested by an application-layer program.

\* \* \* \* \*